Jan. 6, 1925.
C. H. PARSONS ET AL
1,522,386
APPARATUS FOR PASTEURIZING CHEESE
Filed July 11, 1923
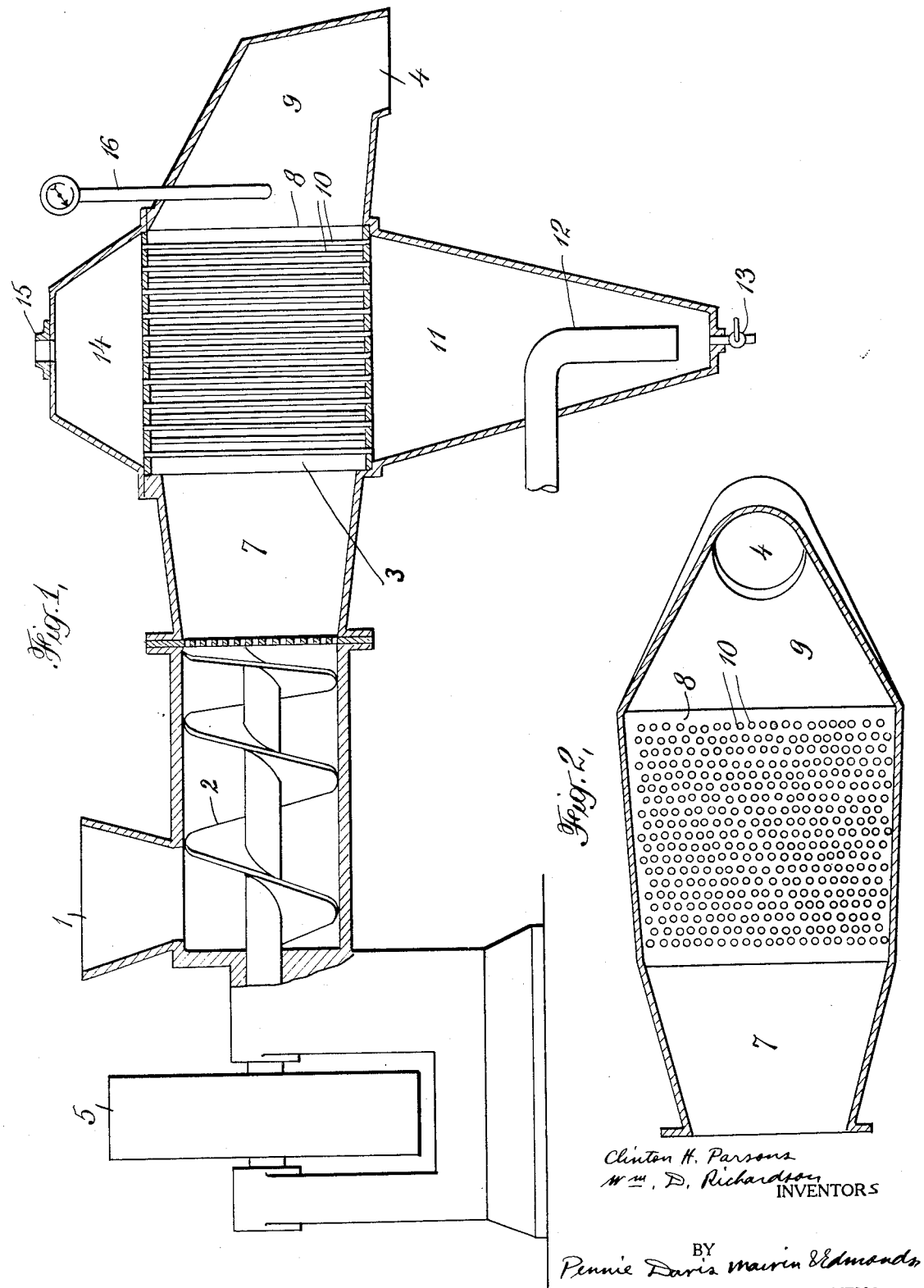
Clinton H. Parsons
W<sup>m</sup>. D. Richardson
INVENTORS
BY Pennie Davis Marvin & Edmonds
ATTORNEYS Patented Jan. 6, 1925.

1,522,386

UNITED STATES PATENT OFFICE.

CLINTON H. PARSONS AND WILLIAM D. RICHARDSON, OF CHICAGO, ILLINOIS, ASSIGNORS TO SWIFT & COMPANY, OF CHICAGO, ILLINOIS, A CORPORATION OF ILLINOIS.

APPARATUS FOR PASTEURIZING CHEESE.

Application filed July 11, 1923. Serial No. 650,973.

*To all whom it may concern:*

Be it known that we, CLINTON H. PARSONS and WILLIAM D. RICHARDSON, citizens of the United States, residing at Chicago, county of Cook, State of Illinois, have invented certain new and useful Improvements in Apparatus for Pasteurizing Cheese; and we do hereby declare the following to be a full, clear, and exact description of the invention, such as will enable others skilled in the art to which it appertains to make and use the same.

The present invention relates to an improved apparatus for the preparation of cheese of smooth and uniform texture in a pasteurized or sterilized condition.

The invention includes improvements in the construction of the pasteurizer itself, as well as improvements in a combined mixing, propelling and pasteurizing apparatus, as hereinafter more fully set forth.

The invention has for its object the preparation of cheese in a pasteurized or sterilized condition such that under ordinary storage it will keep longer than the usual types of cheese.

The cheese which is pasteurized in the apparatus of the present invention may vary in composition. Cheese of uniform character may be pasteurized, without the addition of other substances, or different kinds of cheese may be blended and the resulting mixture pasteurized; or the cheese or mixtures of cheese may have compounded therewith additions such as pimento peppers, sage and other flavoring substances, etc.

The cheese may be supplied to the apparatus in the form of blocks or pieces of suitable size for introduction into the apparatus or it may previously be ground and blended with various admixtures and the resulting mixture supplied to the apparatus in the form of an approximately homogeneous mass, for example, a mixture of graded and blended cheeses either with or without admixtures such as pimento peppers, salt, powdered milk, etc.

The apparatus of the invention comprises means for applying to the cheese, while it is in motion, continuously, a suitably pasteurizing or sterilizing temperature, and means for forcing the cheese through the pasteurizing apparatus where it is subjected to such temperature.

The invention also includes a combined emulsifying and pasteurizing apparatus for first emulsifying the cheese and then forcing the cheese in its pre-emulsified state through the pasteurizing apparatus where the pasteurizing takes places without material separation of the butter-fat contents of the cheese.

The invention also includes an improved pasteurizer construction having a pasteurizing or sterilizing chamber, together with means for forcing the material to be pasteurized or sterilized through the chamber, and heating tubes extending through the chamber with means for circulating through said tubes a heating medium such as hot water or steam, so that the cheese in passing through the chamber in contact with the tubes will be brought to the pasteurizing or sterilizing temperature and maintained at that temperature for an appropriate period of time.

In place of the tubular construction of the pasteurizer or sterilizing apparatus, a cellular structure may be used, the cheese passing through the open cells while the heating medium is forced to circulate through the spaces around the open cells.

The invention will be further described in connection with the accompanying drawings in which Fig. 1 shows one embodiment of the invention, partly in elevation and partly in vertical section, and Fig. 2 shows an enlarged horizontal sectional view of the tubular type of pasteurizer.

In the accompanying drawings the pasteurizer is shown in Fig. 1 as combined with a mixing and propelling means which may also be used as an emulsifier for emulsifying the cheese prior to its pasteurization. This propelling means comprises a hopper 1 and screw propeller 2 driven by suitable means such as a pulley 5.

The pasteurizer 3 is connected with the propelling means by a suitable connection which may or may not have a perforated plate or other means for increasing the back pressure on the propelling and emulsifying device. If the propelling device is not used as an emulsifier, the communication between the propelling means and the pasteurizer may be free and unobstructed. When the propelling device is to be used as an emulsifier, an obstruction such as a perforated plate for increasing the back pressure may be employed.

The pasteurizer has an inlet portion 7 through which the cheese or other material is admitted, a middle chamber 8 in which the heating of the material takes place, and a discharge spout 9 leading to the outlet 4. Within the chamber 8 are a large number of pipes through which hot water is circulated and around which the cheese is forced during its passage through the chamber 8.

Below the chamber 8 is an inlet chamber 11 with a water supply pipe 12 leading downwardly into the lower part of the chamber, and with the drain 13 at the lower part of the chamber. The water entering the lower chamber passes up through the tubes 10 to the upper chamber 14 from which the water escapes through the outlet 15.

A thermometer 16 is shown extending into the discharge spout 9 for showing the temperature of the cheese leaving the sterilizing compartment 8 and similar thermometers (not shown) may be provided in the upper and lower water compartments so that the temperature can be maintained within the desired limits.

In using the apparatus for pasteurizing cheese and the like, the water at the desired temperature is introduced into inlet 12 and flows up through the tubes 10 and out through the outlet 15. The temperature of the water can be regulated as well as its rate of flow so that the drop in temperature of the water flowing through the tubes can be kept within well defined limits.

Cheese is introduced into the inlet 1 and is forced by the screw propeller 2 into the sterilizer chamber 8 and around the heating tubes 10. While it is being continuously forced forward through this chamber and around the heated tubes it is brought to the desired temperature of pasteurization or sterilization and it then flows forward into the spout 9 and through the outlet 4.

It will be evident that the apparatus has numerous advantages for the purpose intended. The apparatus enables the cheese to be heated to a definite temperature for a definite length of time, especially for a short time to avoid over-heating and a cooked flavor, since the temperature and flow of the heating medium through the tubes as well as the movement of the cheese itself can be regulated and controlled, and the sterilizing chamber may also be of such a size and with such an arrangement of the heating tubes that all parts of the cheese will be brought to substantially the same temperature. The size of the chamber and the arrangement of the heating tubes can be varied, while the temperature and flow of the heating medium through the tubes and the movement of the cheese itself can be varied and readily adjusted so that the material to be pasteurized or sterilized can be raised promptly to a predetermined temperature during its passage through the apparatus, and if desired maintained at that temperature a specified length of time before its discharge.

In the construction illustrated it will be noted that the heating tubes 10 are placed rather closely together so that a large heating surface is provided for heating the material as it is forced through the chamber 8. On coming in contact with the heated tubes the cheese is softened to a degree determined by the heat, the size of the heating chamber and the time of passage through said chamber. Being heated and softened it moves without interruption between and past the pasteurizing tubes and so on to the outlet where the pasteurized cheese may be boxed or packaged or subjected to further treatment where this is desired.

In order to produce directly an emulsified as well as a pasteurized or sterilized cheese, the propelling means for forcing the cheese into and through the pasteurizer may advantageously be a combined propelling and emulsifying device such as that shown in the drawings.

The resistance of the cheese in flowing around the tubes in the pasteurizing chamber will cause a considerable back pressure on the propelling device, but this pressure can be further increased by providing a further obstruction such as a perforated plate between the propelling device and the emulsifying chamber. With a propelling device of the character referred to and when it is rotated at a fairly rapid rate, the cheese will be emulsified. The propelling device shown may for example be rotated at from 500 to 600 r. p. m. for large machines such as an Enterprise Hasher or from 1000 to 1200 r. p. m. for small machines. By regulating the back pressure on the machine, the easy slipping of the material as it would ordinarily be effected by the helical screw, is prevented, so that in addition to the ordinary movement of propulsion a considerable whipping and beating action is accomplished on the material. This has the effect in a very short time of producing an excellent emulsion which can then be melted or softened, as in melting, pasteurizing or sterilizing operations, without material separation of its butter-fat content. Emulsification may not occur when the machine is first started into operation, but after the emulsion once starts to form it is able to maintain itself progressively if the propelling device is rotated at a sufficiently rapid rate and if a sufficient back pressure is maintained.

It will be evident that the propelling device, when used as an emulsifier, should propel the material into the pasteurizer at a rate which is so adjusted with reference to the heating effect obtained in the pasteurizing chamber that the material will be subjected to the proper temperature for the proper length of time. This heating of the material, however, can be controlled to a greater or less extent by controlling the temperature and amount of the heating medium flowing through the tubes, thus permitting considerable latitude in the rate at which the material is emulsified and propelled to the pasteurizing chamber.

The combination of an emulsifier with the pasteurizer has the advantage that the pasteurized or sterilized cheese is delivered in an emulsified state without the necessity for further emulsification. The emulsified and pasteurized or sterilized cheese can accordingly be packaged as loaf cheese or in small packages or cartons.

When the pasteurizing apparatus is provided with a propelling means which does not emulsify the cheese, or when the propelling means is so operated that it does not emulsify the cheese, the cheese will be supplied to the pasteurizing or sterilizing chamber in an unemulsified state, but effective pasteurization or sterilization can nevertheless be effected in the manner above described. With a propelling device of the kind illustrated, it will be evident that the rate of advance of the material can be regulated by the speed of the screw and that, even where the action of the screw is not sufficient to cause emulsification, it may nevertheless be sufficient for supplying the material to the pasteurizing chamber at the desired rate. It will also be evident that where an increased back pressure is provided on the propelling device, an increased speed of the screw will be required for obtaining the same rate of advance of material through the pasteurizing chamber as with a slower rate of rotation without the increased back pressure. By regulating the back pressure accordingly it is possible to obtain a proper speed of the screw both for effective emulsification and for effective advance of the material at the desired rate through the pasteurizing apparatus.

Where emulsification is not desired, it will be evident that any suitable propelling means can be used for supplying the material in a continuous manner to the pasteurizing chamber.

It will thus be seen that the present invention provides an improved pasteurizing, or combined emulsifying and pasteurizing, apparatus, in which the cheese is forced into the pasteurizing chamber and subjected therein to a suitable pasteurizing or sterilizing temperature under strictly controlled conditions as to temperature and time of contact; and that the operation can be carried out in a continuous manner.

While a large number of round tubes have been shown in the pasteurizing chamber for the circulation of the heating medium therethrough, it will be evident that this specific construction can be varied and other devices used in place of the tubes for circulating the heating medium into intimate contact with the material flowing through the pasteurizing chamber, as for example a honeycomb cellular structure, or a channeled structure.

In general, the propelling means, even when used as an emulsifier, is preferably kept cool or only luke warm, since by doing so the application of heat to the pasteurizer can be controlled to better advantage. The temperature within the pasteurizer itself can be kept within carefully controlled limits, for example, by using hot water which is circulated through the tubes at 150° F. to 170° F. and by regulating the flow of the cheese so that the temperature at the outlet of the pasteurizer is about 145° F. By maintaining these temperatures and a continuous flow of cheese, it will be evident that pasteurizing conditions can be maintained without giving to the cheese the cooked flavor due to overheating characteristic of other processes in which the cheese is heated and agitated in a steam or hot water jacketed vessel.

By providing a large number of heating tubes, and spacing them as closely together as possible so long as they do not interfere with the proper flow of the cheese through the apparatus, the amount of heating surface can be made relatively very large, so that moderate temperatures may be employed in the heating medium, and the entire mass of cheese nevertheless brought to a temperature closely approximating that of the heating medium within a very short interval of time. As a result, the time required for reaching the pasteurizing temperature, depending on the size and construction of the pasteurizer, may be only from 15 seconds to 1 minute.

If it is desired to sterilize the cheese or subject it to a higher temperature, a higher temperature of the heating medium can be employed, for example, temperatures up to 212° F. with hot water or with open steam, or temperatures somewhat higher with steam under pressure.

The apparatus of the present invention is intended particularly for use in the pasteurizing of cheese in accordance with the processes of our companion applications, Serial No. 650974, and No. 650975, filed of even date herewith.

We claim:

1. An apparatus for pasteurizing cheese comprising a pasteurizing chamber, means for propelling the cheese through said chamber, and heating means extending through said chamber and around which the cheese is forced for raising it to the desired temperature.

2. An apparatus for pasteurizing cheese comprising a pasteurizing chamber, a series of heating tubes extending therethrough, means for circulating a heating medium through said tubes and means for propelling the cheese through said chamber around said tubes.

3. An apparatus for pasteurizing cheese comprising a pasteurizing chamber having an inlet and outlet, propelling means for forcing cheese through said chamber from the inlet to the outlet and means for subjecting the cheese while passing through said chamber to indirect contact with the heating medium.

4. An apparatus for pasteurizing cheese comprising a pasteurizing chamber having a series of vertically arranged tubes extending therethrough, means for circulating a heating medium through said tubes, and means for forcing the material to be pasteurized through said chamber around said tubes.

5. An apparatus for pasteurizing cheese comprising a pasteurizing chamber having a series of vertical arranged tubes extending therethrough, an inlet compartment below the tubes for the introduction of a heating medium, an outlet above the tubes for the escape of the heating medium, and means for forcing the material to be pasteurized through said chamber around said tubes.

6. An apparatus for pasteurizing cheese comprising a combined emulsifying and propelling device and a pasteurizing chamber arranged for the continuous propulsion thereto of the material from said propelling and emulsifying device.

7. An apparatus for pasteurizing cheese comprising a combined emulsifying and propelling device and a pasteurizing chamber having means extended therethrough for heating the chamber to the desired temperature, the emulsifying device and pasteurizing chamber being connected so that the emulsified cheese is propelled continuously through the pasteurizing chamber.

8. An apparatus for pasteurizing cheese comprising a pasteurizing chamber, a series of heating tubes extending therethrough, means for circulating a heating medium through said tubes and means for propelling the cheese through said chamber around said tubes, said propelling means being adapted to emulsify the cheese before its passage through the pasteurizing chamber.

9. An apparatus for pasteurizing cheese comprising a pasteurizing chamber having an inlet and outlet, propelling means for forcing cheese through said chamber from the inlet to the outlet and means for subjecting the cheese while passing through said chamber to indirect contact with the heating medium, said propelling means being adapted to emulsify the cheese before its passage through the pasteurizing chamber.

10. An apparatus for pasteurizing cheese comprising a pasteurizing chamber having a series of vertically arranged tubes extending therethrough, means for circulating a heating medium through said tubes, and means for forcing the material to be pasteurized through said chamber around said tubes, said forcing means being adapted to emulsify the cheese before its passage through the pasteurizing chamber.

11. An apparatus for pasteurizing cheese, comprising a combined emulsifying and propelling device and a pasteurizer arranged at the outlet of said device to receive the emulsified cheese therefrom, and said pasteurizing chamber being constructed to cause a back pressure upon the cheese in the combined emulsifying and propelling device as the cheese is being propelled therethrough and through the pasteurizing chamber.

12. An apparatus for pasteurizing cheese, comprising a combined emulsifying and propelling device and a pasteurizing chamber directly connected with the outlet end of said device, whereby the cheese is propelled continuously therethrough by the propelling device, and said pasteurizing chamber being adapted to cause a back pressure upon the cheese in the combined emulsifying and propelling device.

13. An apparatus for pasteurizing cheese, comprising a pasteurizing chamber having an inlet and outlet, heating means extending through said chamber and around which the cheese is forced for raising it to the desired temperature, and a propelling device having a screw propeller therein for propelling the cheese through the pasteurizing chamber, said propelling device being directly connected with the inlet to the pasteurizing chamber.

14. An apparatus for pasteurizing cheese, comprising a combined emulsifying and propelling device having a screw propeller therein, and a pasteurizing chamber arranged with its inlet in direct communication with the outlet from said device and adapted for the continuous propulsion therethrough of the material from said propelling and emulsifying device.

15. An apparatus for pasteurizing cheese, comprising a pasteurizing chamber having an inlet and outlet, a combined emulsifying and propelling device having a propelling and emulsifying screw therein, and directly discharging into the inlet of the pasteurizing chamber, and the pasteurizing chamber having heating tubes and being adapted to cause a back pressure upon the cheese in the combined emulsifying and propelling device.

In testimony whereof we affix our signatures.

CLINTON H. PARSONS.
WILLIAM D. RICHARDSON.